United States Patent [19]
Kishi et al.

[11] Patent Number: 5,145,736
[45] Date of Patent: Sep. 8, 1992

[54] CELLULOSE-DERIVED SPONGE AND PROCESS FOR MANUFACTURING SAME

[75] Inventors: Minoru Kishi, Tokyo; Yukihiro Kaneko; Hiro Itoh, both of Funabashi, all of Japan

[73] Assignee: Lion Corporation, Japan

[21] Appl. No.: 782,317

[22] Filed: Oct. 24, 1991

[30] Foreign Application Priority Data

Nov. 29, 1990 [JP] Japan .................................. 2-331155

[51] Int. Cl.$^5$ .......................... B32B 5/16; C08J 9/30
[52] U.S. Cl. ..................................... 428/332; 106/122
[58] Field of Search ......................... 428/332; 106/122

[56] References Cited

U.S. PATENT DOCUMENTS

| | | | |
|---|---|---|---|
| 3,912,665 | 10/1975 | Spitzer et al. | 521/149 |
| 3,912,666 | 10/1975 | Spitzer et al. | 521/149 |
| 3,912,667 | 10/1975 | Spitzer et al. | 521/78 |
| 4,328,319 | 5/1982 | Ospipow et al. | 521/78 |
| 4,422,877 | 12/1983 | Spitzer | 521/111 |

*Primary Examiner*—Morton Foelak
*Attorney, Agent, or Firm*—Lorusso & Loud

[57] ABSTRACT

A cellulose-derived sponge showing good flexibility even in a dried state is disclosed, which comprises a matrix of a cellulose having an open-cell structure. The sponge shows mechanical properties satisfying at least one of the following conditions (I) and (II):

$$Y \leqq 0.07X^3 + 0.39X^2 - 0.04X + 0.04 \qquad \text{(I)}$$

$$Z \leqq 0.24X^3 + 1.17X^2 - 0.78X + 0.08 \qquad \text{(II)}$$

wherein X, Y and Z stand for the thickness (mm), the bending rigidity (gf cm$^2$/cm) and the hysteresis of bending moment (gf cm/cm), respectively, of the sponge having a bulk density of 0.8 g/cm$^3$ or less and a water content of 25% by weight or less. The sponge may be prepared by mixing viscose, reinforcing fibers, salt cake, a foaming agent and an anionic polyelectrolyte with each other, and solidifying the mixture in a mold.

1 Claim, 1 Drawing Sheet

CELLULOSE-DERIVED SPONGE AND PROCESS FOR MANUFACTURING SAME

BACKGROUND OF THE INVENTION

This invention relates to a cellulose-derived sponge showing good flexibility even in a dried state and a process for manufacturing same.

As is well known, a cellulose-derived sponge is manufactured from a mixture of viscose, reinforcing fibers such as cotton fibers or hemp fibers, a cell-forming agent, and salt cake. It is also known to add salt cake having a small particle diameter to viscose to such degree that neither salting out nor solidification takes place for the purpose of improving flexibility of a resulting sponge. However, addition of such salt cake is still insufficient. Japanese Patent Publication No. 47-50867 discloses a process of manufacturing a cellulose-derived sponge using latex-containing viscose. The cellulose-derived sponge obtained by this process is still unsatisfactory since elasticity imparted by the remaining latex is insufficient to give a satisfactory flexibility to the cellulose-derived sponge in a dry state. Japanese Unexamined Patent Publication No. 49-74763 discloses a cellulose-derived sponge containing a water-soluble or water-dispersible, high-molecular, hydrophilic, film-forming polymer. However, this sponge shows a poor flexibility.

It is further known to impregnate a plasticizer such as glycerol or propylene glycol in a molded sponge for the purpose of improving flexibility of the sponge in a dried state. Cellulose-derived sponges having impregnated therein a plasticizer show good softness but, once being washed with water, the sponge shows a poor softness after being dried since the plasticizer such as a polyol is washed away. Thus, impregnation of a plasticizer cannot be a substantial dissolution of the problem.

SUMMARY OF THE INVENTION

It is an object of the present invention to provide a cellulose-derived sponge showing a long-lasting excellent flexibility in a dry state even after being washed with water.

Another object of the present invention is to provide a process for manufacturing the sponge in an industrially advantageous manner.

These objects can be attained by a sponge comprising a matrix of a cellulose having an open-cell structure, said sponge showing mechanical properties satisfying at least one of the following conditions (I) and (II):

$$Y \leq 0.07X^3 + 0.39X^2 - 0.04X + 0.04 \quad (I)$$

$$Z \leq 0.24X^3 + 1.17X^2 - 0.78X + 0.08 \quad (II)$$

wherein X, Y and Z stand for the thickness (mm), the bending rigidity (gf•cm²/cm) and the hysteresis of bending moment (gf•cm/cm), respectively, of said sponge having a bulk density of 0.8 g/cm³ or less and a water content of 25% by weight or less and a process for manufacturing the sponge, which comprises mixing viscose, reinforcing fibers, salt cake, a foaming agent and an anionic polyelectrolyte with each other, introducing the mixture into a mold, and heating the mixture to solidify.

BRIEF DESCRIPTION OF THE DRAWINGS

Other objects, features and advantages of the present invention will become apparent from the detailed description of the preferred embodiments of the invention to follow, when considered in light of the accompanying drawings, in which:

FIG. 2: ×1,000); FIG. 4: ×1,010).

DETAILED DESCRIPTION OF THE PREFERRED EMBODIMENTS OF THE INVENTION

Figure 1:
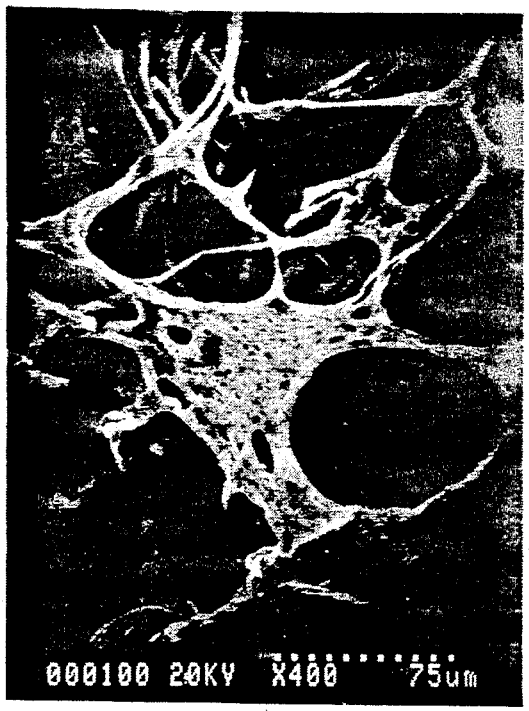
FIGS. 1 and 2 are photographs showing a cellulose-derived cellulose in accordance with the present invention (FIG. 1: ×400.

Cellulose is a chain polymer wherein D-glucose residues are bound to each other through β-glucoside bond, and cellulose molecules are alongside strongly bound to each other due to hydrogen bonds formed between adjacent cellulose molecules, thus cellulose being extremely rigid. Reduction in particle size of salt cake or incorporation of latex cannot change the rigidity of cellulose matrix, and fails to markedly improve softness of a cellulose-derived sponge.

As a result of intensive investigations to solve the above-described problems, the inventors have found that an enough flexibility can be imparted to the higher structure of cellulose by mixing an anionic polyelectrolyte and a foaming agent together with reinforcing fibers and salt cake as additives to viscose.

The polyelectrolyte to be used in the present invention is a polymer having a number of ion-dissociating groups capable of dissociating ions upon being dissolved in a solvent (water) along the molecular chain. Although viscose (an aqueous solution of cellulose xanthate) itself is an anionic polyelectrolyte, it is excluded from the anionic polyelectrolyte of the present invention.

As the anionic polyelectrolyte to be used in the present invention, there are included, for example, synthetic homopolymers (e.g., polyacrylic acid, polyaconitic acid, polyitaconic acid, polyglutamic acid, polycitraconic acid, polystyrenesulfonic acid, polystyrenephosphoric acid, polyvinylsulfonic acid, polyvinylphosphoric acid, polyfumaric acid, polymaleic acid and polymethacrylic acid), synthetic copolymers (e.g., itaconic acid-ethylene copolymer, maleic anhydride-acrylic ester copolymer and maleic anhydride-styrene copolymer) and natural polymers (e.g., alginic acid and gum arabic). Since the cellulose solution is also solidified by the addition of an acid, the polyelectrolyte must be added in a totally neutralized form in order to prevent solidification of the cellulose solution upon being mixed with the polyelectrolyte. As alkaline substances to be used for such neutralization, alkali metal salts, alkaline earth metal salts, etc. which are commonly used may be used, with noting not to excessively neutralize over the neutralizing point.

The polyelectrolyte to be used in the present invention is not particularly limited as to molecular weight as long as effective charge of the polymer ion increases with dissociation of the counter ion and serves to expand the molecular chain owing to charge repulsion. As a general guide, it suffices for the polyelectrolyte to have a viscosity average molecular weight of 200 (oligomer region) or more. Amount of the polyelectrolyte is not particularly limited since it varies depending upon kind, molecular weight, ionic strength, etc. of polyelectrolyte to be used. The polyelectrolyte is preferably used as an aqueous solution rather than as solids.

The foaming agent to be used in the present invention is preferably an anionic surfactant, a nonionic surfactant, a polyol compound or an amide compound. Cationic surfactants should be avoided since they can form complex with the polyelectrolyte and viscose. The anionic surfactants are exemplified by a sodium α-olefinsulfonate containing 14 carbon atoms and sodium laurylsulfate, the nonionic surfactants are exemplified by Tween 80 (manufactured by Atlas Powder Co.) and diethanolamide having 12 carbon atoms, the polyol compounds are exemplified by polyglycerin and polyethylene glycol having a viscosity average molecular weight of 90–10,000, and the amide compounds are exemplified by polyacrylamides.

Cellulose contained in the starting viscose is not particularly limited as to molecular weight but, as a general guide, cellulose having a viscosity average molecular weight of 30,000–90,000 is suitable. Concentration of cellulose in the solution is preferably 6–10% by weight.

The reinforcing fibers are not particularly limited as to kind, fineness, length, form, etc. and are incorporated in an amount of preferably 10–60% based on a resulting sponge.

Salt case is incorporated in an amount 20–60 times as much as sum of the cellulose and reinforcing fibers in the cellulose solution.

In addition to the aforementioned ingredients, auxiliary agents such as colorants, deodorizers and bactericides may optionally be added to viscose as the case demands.

A mixture of the anionic polyelectrolyte, foaming agent, cellulose solution, reinforcing fibers, salt cake and other additives is molded and heated to solidify, followed by treating the resulting solidified product with an acid and washing with water to obtain a sponge. Mixing manner for preparing the mixture is not particularly limited but, since the transition temperature of the salt cake in the mixture is 10° C., mixing temperatures higher than 10° C. are not preferred due to salting-out phenomenon which in turn causes solidification of the mixture during the mixing procedure.

Heating is conducted preferably at 90° C. or higher, and acid treatment and water-washing procedure may be conducted in a commonly employed manner.

The thus-obtained cellulose-derived sponge is almost free of other added ingredients than the matrix cellulose and the reinforcing fibers after being solidified and subjected to after-treatment, and is therefore substantially different from those cellulose-derived sponges which contain impregnated therein a polyol.

Figure 2:
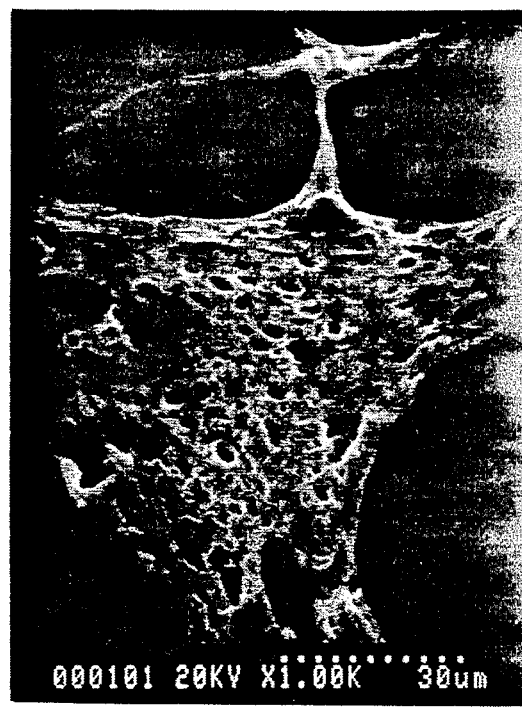
Figure 3:
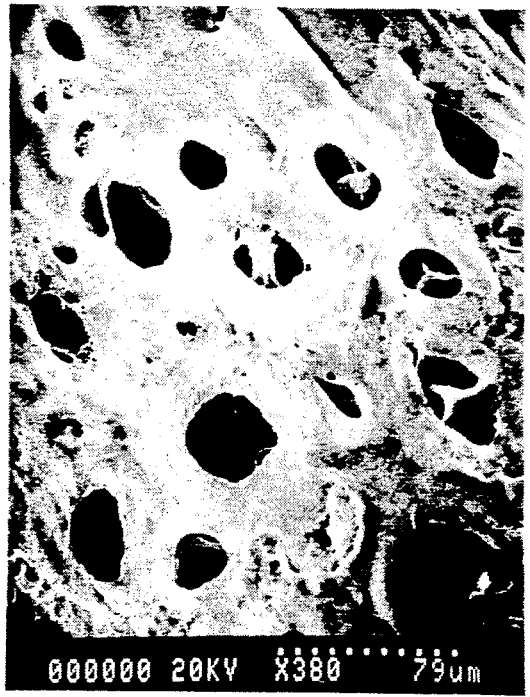
FIGS. 3 and 4 are photographs showing a conventional cellulose-derived cellulose (FIG. 3: ×380.
Figure 4:

FIGS. 1 through 4 are electron microscopic photographs (SEM) showing the structure of the cellulose-derived sponge of the present invention and that of a conventional cellulose-derived sponge. As is apparent from FIGS. 1 and 2, the cellulose-derived sponge of the present invention has the structure wherein the void-forming matrix itself also has innumerable, extremely small pores and unevenness in comparison with the sizes of the voids, which structure is markedly different from that of the conventional cellulose-derived sponge (FIGS. 3 and 4). The particular structure of the cellulose-derived sponge of the present invention is formed because, when a mixture containing two or more different high-molecular polymers (cellulose, polyelectrolyte, etc.) kept at a low temperature of about 8° C. is introduced into a bath kept at a high temperature of 90° C. or above to solidify, phase separation takes place between the anionic polyelectrolyte and cellulose in the course of regeneration of cellulose in the high-temperature bath. This particular structure formed by the phase separation serves to improve flexibility of the sponge. Addition of a nonionic high-molecular polymer, a low-molecular polymer or other substance in place of the anionic polyelectrolyte does not cause the phase separation and, as a result, there is not obtained the cellulose-derived sponge of the present invention.

The sponge of the present invention shows a good softness which is not changed even after repeated washing. It also shows a good liquid-absorbing property. Wastes or towels made of the cellulose-derived sponge of the present invention give an extremely soft touch upon use. Absorbers containing the sponge of the present invention as an absorbent give extremely good touch and show extremely remarkable liquid-absorbing property.

The present invention is now described in more detail by reference to the following Examples and Comparative Examples.

EXAMPLE 1

To a viscose (cellulose xanthate aqueous solution) containing 9% by weight of cellulose of 60,000 in viscosity average molecular weight and 5% by weight of an alkali and being kept at 6° C. in a stirrer were added 4% by weight of sodium polyacrylate having a viscosity average molecular weight of 70,000 (used in the form of 20% aqueous solution) as a polyelectrlyte, 2% by weight of sodium α-olefinsulfonate containing 14 carbon atoms and 3% by weight of polyethylene glycol (#600) as foaming agents, and 4% by weight of ramie hemp fibers of 10 mm in length as reinforcing fibers and, after mixing, salt cake was added to the resulting mixture in an amount as much as 40 times the sum of the cellulose and the reinforcing fibers contained in the viscose. After molding the mixture into a piece of 1.5 mm in thickness, the molded piece was solidified in a 90°–100° C. water for 1 hour, then immersed into 4% sulfuric acid to completely reproduce cellulose. This piece was then washed with water and dried to obtain a cellulose-derived sponge having a thickness of 1.5 mm. FIGS. 1 and 2 show electron microscopic photographs of this sponge.

EXAMPLE 2

Procedures described in Example 1 were repeated except for changing the thickness of sponge to 2.5 mm to obtain a cellulose-derived sponge having a thickness of 2.5 mm. FIGS. 1 and 2 also show electron microscopic photographs of this sponge.

EXAMPLE 3

Procedures described in Example 1 were repeated except for changing the thickness of sponge to 4.0 mm to obtain a cellulose-derived sponge having a thickness of 4.0 mm. FIGS. 2 and 2 also show electron microscopic photographs of this sponge.

EXAMPLE 4

Procedures described in Example 1 were repeated except for using sodium polyacrylate having a viscosity average of 1,500 (used as a 40% aqueous solution) as a polyelectrolyte to obtain a cellulose-derived sponge.

EXAMPLE 5

Procedures described in Example 1 were repeated except for using sodium polyacrylate having a viscosity average of 1,000,000 (used as a 10% aqueous solution) as a polyelectrolyte to obtain a cellulose-derived sponge.

EXAMPLE 6

Procedures described in Example 1 were repeated except for changing the amount of sodium polyacrylate to 8% by weight to obtain a cellulose-derived sponge.

EXAMPLE 7

Procedures described in Example 1 were repeated except for using sodium polystyrenesulfonate (Mv = 14,000; used as a 40% aqueous solution) as the polyelectrolyte to obtain a cellulose-derived sponge.

EXAMPLE 8

Procedures described in Example 1 were repeated except for using sodium polyglutamate (Mv = 7,000; used as a 40% aqueous solution) as the polyelectrolyte to obtain a cellulose-derived sponge.

EXAMPLE 9

Procedures described in Example 1 were repeated except for using a neutralized maleic acid-styrene copolymer (Mv = 12,000; used as a 10% aqueous solution) as the polyelectrolyte to obtain a cellulose-derived solution.

EXAMPLE 10

Procedures described in Example 1 were repeated except for using sodium alginate (Mv = 50,000; used as a 10% aqueous solution) as the polyelectrolyte to obtain a cellulose-derived sponge.

COMPARATIVE EXAMPLE 1

Procedures described in Example 1 were repeated except for not adding the polyelectrolyte to obtain a cellulose-derived sponge. FIGS. 3 and 4 show electron microscopic photographs of this sponge.

COMPARATIVE EXAMPLE 2

Procedures described in Comparative example 1 were repeated except for adding polyvinyl alcohol (Mv = 70,000; used as a 10% aqueous solution) in an amount of 4% by weight as a nonionic polymer to obtain a cellulose-derived sponge.

COMPARATIVE EXAMPLE 3

Procedures described in Comparative example 1 were repeated except for adding sodium acrylage in an amount of 4% by weight as a nonionic polymer to obtain a cellulose-derived sponge.

COMPARATIVE EXAMPLE 4

Glycerin was added to the cellulose-derived sponge obtained in Comparative example 1 in an amount of 20%, followed by drying to obtain a cellulose-derived sponge.

COMPARATIVE EXAMPLE 5

The sponge obtained in Comparative example 1 was well washed with water and again dried to obtain a cellulose-derived sponge.

Each of the thus-obtained cellulose-derived sponges were cut into 2 × 10 cm pieces and were subjected to measurement of bending rigidity and hysteresis of bending moment by means of a sheer bending tester (KES-FB2) made by Kato Tech K.K. in an atmosphere of 20° C. and 65% RH. In addition, they were compared with each other with respect to touch (organoleptic property).

Separately, each of the sponges were cut into 10 × 10 cm pieces, dipped into wager for 3 minutes and left on a wire netting for 5 minutes for hydro-extraction to measure water absorption ability.

The results thus obtained are tabulated in Tables 1, 2 and 3. In the tables, $C_Y$ and $C_Z$ stand for values calculated according to the following formulae (wherein X represents thickness of a sponge):

$$C_Y = 0.07X^3 + 0.39X^2 - 0.04X + 0.04$$

$$C_Z = 0.24X^3 + 1.17X^2 - 0.78X + 0.08$$

TABLE 1

| | Example | | | | | |
|---|---|---|---|---|---|---|
| | 1 | 2 | 3 | 4 | 5 | 6 |
| Additive | Sodium polyacrylate | | | | | |
| Molecular weight | | 70000 | | 1500 | 1000000 | 70000 |
| Added amount (wt %) | | 4 | | | 4 | 8 |
| Thickness (mm) | 1.5 | 2.5 | 4.0 | | 2.5 | 2.5 |
| Bending rigidity Y (gf · cm²/cm) ($C_Y$) | 0.6 (1.1) | 2.5 (3.5) | 8.2 (10.8) | 2.0 (3.5) | 1.8 (3.5) | 2.1 (3.5) |
| Hysteresis of bending moment (gf · cm/cm) ($C_Z$) | 0.9 (2.4) | 6.2 (9.2) | 21.2 (31.0) | 5.4 (9.2) | 4.5 (9.2) | 5.8 (9.2) |
| Touch #1 | A | A | A | A | A | A |
| Absorption ability (g/g) | 38 | 38 | 38 | 37 | 36 | 35 |

1
A ... very soft
B ... soft
C ... slightly hard
D ... hard

TABLE 2

| | Example | | | |
|---|---|---|---|---|
| | 7 | 8 | 9 | 10 |
| Additive | Sodium polystyrene sulfonate | Sodium polyglutamate | Maleic acid-styrene copolymer | Sodium alginate |
| Molecular weight | 14000 | 7000 | 12000 | 50000 |
| Added amount (wt %) | 4 | 4 | 4 | 4 |
| Thickness (mm) | 2.5 | 2.5 | 2.5 | 2.5 |
| Bending rigidity Y (gf · cm²/cm) ($C_Y$) | 2.6 (3.5) | 2.7 (3.5) | 3.0 (3.5) | 3.2 (3.5) |
| Hysteresis of bending moment (gf · cm/cm) ($C_Z$) | 6.5 (9.2) | 7.0 (9.2) | 8.5 (9.2) | 8.7 (9.2) |
| Touch #1 | A | A | B | B |
| Absorption ability (g/g) | 35 | 34 | 32 | 32 |

1
A ... very soft
B ... soft
C ... slightly hard
D ... hard

TABLE 3

| | Comparative Example | | | | |
|---|---|---|---|---|---|
| | 1 | 2 | 3 | 4 | 5 |
| Additive | — | Polyvinylolyalcohol | Sodium acryate | | — |
| Molecular weight | — | 70000 | 94 | | — |
| Added amount (wt %) | — | 4 | 4 | | — |
| Thickness (mm) | 2.5 | 2.5 | 2.5 | 2.5 | 2.5 |
| Bending rigidity Y (gf · cm²/cm) ($C_Y$) | 5.3 (3.5) | 9.6 (3.5) | 4.8 (3.5) | 3.6 (3.5) | 5.2 (3.5) |
| Hysteresis of bending moment (gf · cm/cm) ($C_Z$) | 14.3 (9.2) | 23.3 (9.2) | 13.1 (9.2) | 9.5 (9.2) | 14.6 |
| Touch #1 | C | D | C | B-C | C |
| Absorption ability (g/g) | 27 | 21 | 27 | 28 | 27 |

1
A ... very soft
B ... soft
C ... slightly hard
D ... hard

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A sponge comprising a matrix of a cellulose having an open-cell structure, said sponge showing mechanical properties satisfying at least one of the following conditions (I) and (II):

$$Y \leq 0.07X^3 + 0.39X^2 - 0.04X + 0.04 \quad (I)$$

$$Z \leq 0.24X^3 + 1.17X^2 - 0.78X + 0.08 \quad (II)$$

wherein X, Y and Z stand for the thickness (mm), the bending rigidity (gf cm²/cm) and the hysteresis of bending moment (gf cm/cm), respectively, of said sponge having a bulk density of 0.8 g/cm³ or less and a water content of 25% by weight or less.

* * * * *